(12) United States Patent
Arioka et al.

(10) Patent No.: US 6,518,531 B2
(45) Date of Patent: Feb. 11, 2003

(54) GAS-INSULATED SWITCHGEAR

(75) Inventors: Masahiro Arioka; Junichiro Nishitani, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 61 days.

(21) Appl. No.: 09/870,674

(22) Filed: Jun. 1, 2001

(65) Prior Publication Data

US 2002/0008084 A1 Jan. 24, 2002

(30) Foreign Application Priority Data

Jun. 2, 2000 (JP) .......................................... 2000-166141

(51) Int. Cl.[7] .............................. H01H 3/00; H01H 3/24; H01H 3/32
(52) U.S. Cl. ............................ 218/154; 218/7; 218/12; 218/120
(58) Field of Search ................................. 218/118, 120, 218/139, 140, 134, 153, 154, 2, 4, 7–14

(56) References Cited

U.S. PATENT DOCUMENTS

| 5,003,427 | A | | 3/1991 | Reichl et al. | |
| 5,508,486 | A | * | 4/1996 | Spack et al. | 218/119 |
| 5,594,223 | A | * | 1/1997 | Fukushi et al. | 200/11 TC |
| 5,808,258 | A | * | 9/1998 | Luzzi | 218/136 |
| 6,016,247 | A | | 1/2000 | Dams et al. | |

OTHER PUBLICATIONS

European Search Report dated Sep. 20, 2001.

* cited by examiner

Primary Examiner—Elvin Enad
Assistant Examiner—M. Fishman
(74) Attorney, Agent, or Firm—Sughrue Mion, PLLC

(57) ABSTRACT

A gas-insulated switchgear having three gas-insulated hermetic vessels containing a disconnector for disconnecting a circuit and shunt conductors connected in parallel to each other between the disconnectors of the three hermetic vessels. The shunt conductors each include a conductor having terminal portions extending through and penetrating into the hermetic vessels and a main body portion connected and shunted between the terminal portions for parallel distributing an electric power from a first hermetic vessel to second and third hermetic vessels, an insulating material covering the main body portion and an electrically conductive coating disposed on an outer surface of the insulating material and grounded. The main body portion of the conductor is disposed outside of the hermetic vessels.

5 Claims, 4 Drawing Sheets

GAS-INSULATED SWITCHGEAR

CROSS REFERENCE TO RELATED APPLICATION

This application is based on Application No. 2000-166141, filed in Japan on Jun. 2, 2000, the contents of which are hereby incorporated by reference.

BACKGROUND OF THE INVENTION

This invention relates to a gas-insulated switchgear and, more particularly, to a gas-insulated switchgear having a device for interrupting an electric power system upon the generation of a failure in the power system and having a dual bus bar structure.

FIG. 4 illustrates a conventional gas-insulated switchgear having a dual bus conductor structure disclosed in Japanese Utility Model Laid-Open No. 2-23049. In the figure, the reference numeral 1 depicts circuit interrupters, 2 are bus conductor side and line side disconnectors, the one disposed at the lower position is a line side disconnector to be connected to a line through a cable head which will be described later. 3 is a grounding switchgear, 4 is a potential current transformer, 5 are cable heads, 6 are main bus conductors, 7 are connection conductors, 8 is an electrically insulating gas, 9 is a cubicle outer shell vessel containing therein together components of this apparatus, such as the disconnectors 2, the grounding switchgear 3, the potential current transformer 4, the cable heads 5, the main bus conductors 6 and the connection conductors 7. 10 are separate metal vessel containing therein the main bus conductors 6 and the bus conductor side disconnectors 2, the metal vessels 10 being hollow cylinders having a circular or substantially elongated circular cross section and filled with an electrically insulating gas at 5 kgf/cm$^2$ (gauge pressure).

As understood from FIG. 4, the maintenance and the inspection of the components disposed within the cubicle outer shell vessel 9 of the conventional gas-insulated switchgear can be achieved without the need for interrupting the power supply to the main bus conductors 6. However, since the switchgear has a junction structure for making the bus conductor side disconnectors 2 and the connection conductors 7 separable in case of the need for separating the cubicle outer shell vessel 9 from the metal vessel 10, the number of parts is large and structure is complicated. Also, the points of separation of the dual bus conductors are located inside of the outer shell vessel 9, so that the realization of a large current-carrying capacity is significantly affected and impeded by the temperature rise within the outer shell vessel 9.

SUMMARY OF THE INVENTION

Accordingly, a main object of the present invention is to provide a gas-insulated switchgear that has a simple structure and a small number of parts and that is small in temperature rise within the outer shell vessel so that the current-carrying capacity is significantly increased.

With the above object in view, the present invention resides in a gas-insulated switchgear comprising a first hermetic vessel filled with an electrically insulating gas and having accommodated therein a circuit interrupter for interrupting a circuit and a disconnector disconnecting the circuit. A second hermetic vessel filled with an electrically insulating gas and having accommodated therein a disconnector and a third hermetic vessel disposed in parallel to said second hermetic vessel and filled with an electrically insulating gas and having accommodated therein a disconnector for disconnecting the circuit. The switchgear also comprises shunt conductors connected in parallel to each other between said disconnector within said first hermetic vessel and said disconnectors within said first and second hermetic vessels. The shunt conductors each comprises a conductor having terminal portions extending through and penetrating into said first hermetic vessel and said second and third hermetic vessels and a main body portion connected and shunted between said terminal portions for parallel distributing an electric power from said first hermetic vessel to said second and third hermetic vessels, an insulating material covering said main body portion, and an electrically conductive coating disposed on an outer surface of said insulating material and grounded.

The main body portion of the conductor may be disposed outside of the hermetic vessel.

Each of the terminal portions of the conductor may comprise a conductor for pivotally supporting a movable contact blade of the disconnector within the hermetic vessel.

At least three of the shunt conductors may be provided.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENT

Figure 1:
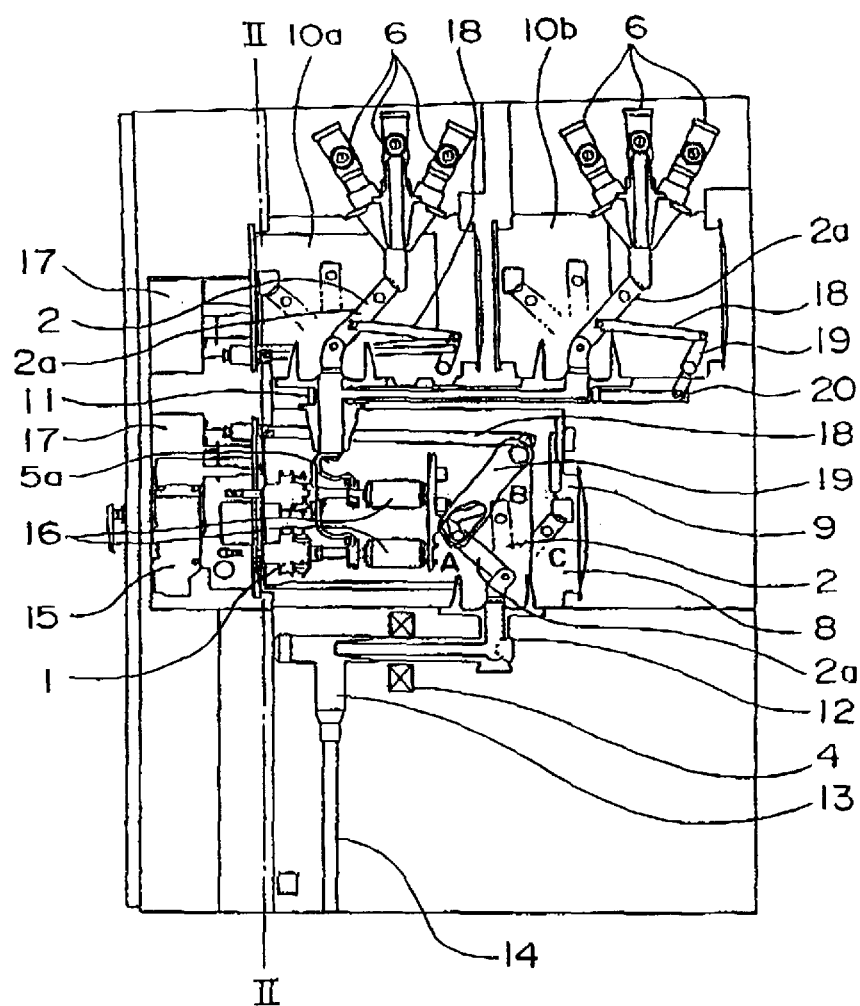
FIG. 1 is a schematic side view of the gas-insulated switchgear according to the present invention.
Figure 2:
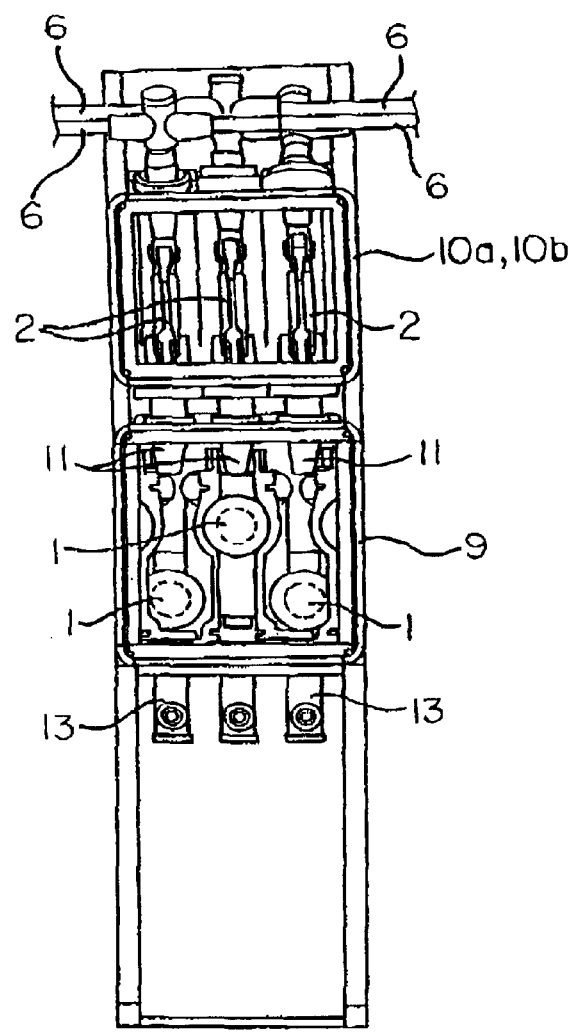
FIG. 2 is a sectional view taken along line II—II of FIG. 1.

The present invention will now be described in detail in conjunction with the drawings in terms of an embodiment of a gas-insulated switchgear for a three-phase ac circuit. FIG. 1 is a schematic side view of the gas-insulated switchgear according to the present invention and FIG. 2 is a sectional view taken along line II—II of FIG. 1, in which reference numeral 1 depict interrupters, 2 are three-point disconnectors on the line side which can take position A for the ON position of the disconnectors, position B for the OFF position of the disconnectors or position C for the GROUNDED position. The reference numeral 6 is an insulated bus conductor, of which connection and disconnection are achieved by the bus conductor side three-point disconnectors 2. 8 is an electrically insulating gas filled in an outer shell vessel 9 as well as hermetic vessels which are metal vessels which will be described later in detail to ensure the insulation of the components such as the interrupters 1 within the vessels. 9 is an outer shell vessel containing therein the components of the apparatus together and 10a, 10b are hermetic vessels for accommodating the bus conductor side disconnectors 2.

Figure 3:
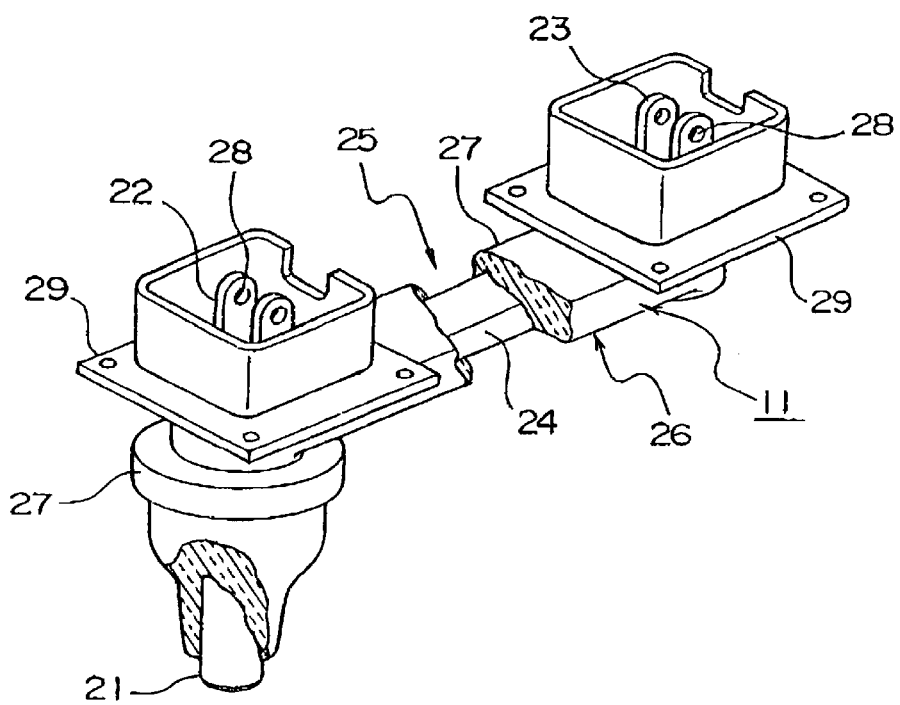
FIG. 3 is a perspective view showing the shunt conductor of the gas-insulated switchgear of the present invention.
Figure 4:
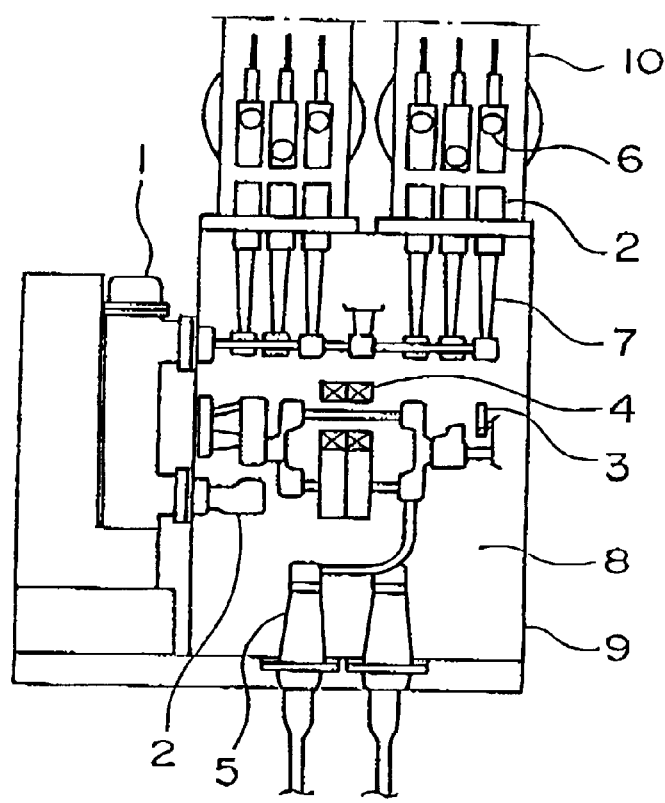
FIG. 4 is a schematic view of a conventional gas-insulated switchgear.

The reference numeral 11 is a shunt conductor which is an electrically insulating bushing. As illustrated in FIG. 3, the shunt conductor 11 comprises a conductor portion 25 having first to third terminal portions 21–23 and a main body portion 24, an insulator portion 26 coating the conductor portion 25 and an electrically conductive coating 27 disposed on the outer surface of the insulation portion 26 and grounded.

The first terminal portion 21 of the conductor portion 25 extends to pass through the vessel wall of the first hermetic vessel 9 and into the interior of the hermetic vessel 9 so that it is connected, through a flexible conductor 5a secured by bolts and nuts, to a movable contact rod which is a movable portion of the interrupter 16 disposed within the hermetic vessel 9.

The second terminal portion 22 and the third terminal portion 23 of the conductor portion 25 extend to pass through the vessel walls of the second and the third hermetic vessels 10a and 10b, respectively, and into the interior of the second and the third hermetic vessels 10a and 10b and are provided at their end portions with holes 28 for receiving therein pivot shafts for pivotally connecting blades 2a which are movable portions of the bus conductor disconnectors 2 disposed within the hermetic vessels 10a and 10b so that the blades 2a can take the above-discussed three positions.

The main body portion 24 of the conductor portion 25 extend and shunt between the above-mentioned terminal portions 21, 22 and 23 so that the electric power from the disconnectors 2 within the first hermetic vessel 9 may be distributed in parallel to the interrupters 16 within the second and the third hermetic vessel 10a and 10b. Also, the main body portion 24 is insulated by the insulator 26 that covers the outer surface of the main body portion 24 except for the terminal portions 21–23. The insulator 26 has portions that define mounting flanges 29 extending around the terminal portions 22 and 23, so that the shunt conductors 11 can be hermetically secured by bolts or the like to and through hermetic vessels 9, 10a and 10b. The insulator 26 has disposed on its outer surface an electrically conductive coating 27, which is grounded.

In the illustrated embodiment, the main body portion 24 of the conductive portion 25 is located outside of the hermetic vessels 9, 10a and 10b and only the terminal portions 21–23 pass through the vessel wall and extend into the inside of the hermetic vessel. At least three of these shunt conductors 11 are provided so that the apparatus may cope with the three-phase power system.

The reference numeral 12 is a lower bushing pivotally supporting at one end the blade 2a of the line-side disconnector 2 and connected at the other end to the cable head 13. 14 is a cable, which is a medium for supplying electric power from the power utility company to the gas switchgear for the power distribution substation and which is a medium for supply power to the load for the feeder panel plate. 4 is a potential current transformer placed over the lower bushing 12 in a concentric relationship for conveying the current value of the current flowing through the lower bushing 12 to the instruments (not shown) to achieve the conservation of the power and measurement.

The reference numeral 15 is an interrupter operating mechanism for operating the movable contact (not shown) of the vacuum switch valves 16 to throw in or interrupt the normal and fault currents. 17 is a disconnector operating mechanism for operating the blades 2a through the insulating links 18 and the levers 19 to change the circuit between ON, OFF and GROUNDED. In order to operate two bus conductor side disconnectors, there are two disconnector operating mechanisms 17 side by side, the operating link 20 of the bus conductor side disconnector 2 on the right in FIG. 1 is disposed between the phases of the insulating bushings 11 and arranged to operate the blades 2a through the levers 19.

Thus, the gas-insulated switchgear of the present invention comprises a first hermetic vessel 9 filled with an electrically insulating gas and having accommodated therein a circuit interrupter 1 for interrupting a circuit and a disconnector 2 for disconnecting the circuit, a second hermetic vessel 10a filled with an electrically insulating gas and having accommodated therein a disconnector 2, and a third hermetic vessel 10b disposed in parallel to the second hermetic vessel 10a and filled with an electrically insulating gas and having accommodated therein a disconnector 2 for disconnecting the circuit. The switchgear also comprises shunt conductors 11 connected in parallel to each other between the disconnector 2 within the first hermetic vessel 9 and the disconnectors 2 within the first and second hermetic vessels 10a and 10b .

The shunt conductor 11 each comprises a conductor having terminal portions 21–23 extending through and penetrating into the first hermetic vessel 9 and the second and third hermetic vessels 10a and 10b and a main body portion 24 connected and shunted between the terminal portions 9, 10a and 10b for parallel distributing an electric power from the first hermetic vessel 9 to the second and third hermetic vessels 10a and 10b, an insulating material 26 covering the main body portion 24, and an electrically conductive coating 27 disposed on an outer surface of the insulating material 26 and grounded.

Therefore, the shunting portion of the dual bus conductor which is shunt conductors 11 are at the outside of the hermetic vessels 9, 10a and 10b, so that the heat generated by the current flowing through the shunted portion of the conductor portion 25 can be easily conducted to the outside. Thus, the insulating bushings 11 are located outside of the hermetic vessels 9, 10a and 10b and the linkage for operating the bus conductor side disconnectors 2 are positioned between the phases of the insulating bushings 11, such that the lever 19 is pivoted through the insulating links 18 to drive the blade 2a, so that the gas-insulated switchgear can be made small-sized.

As has been described, the gas-insulated switchgear according to the present invention comprises a first hermetic vessel filled with an electrically insulating gas and having accommodated therein a circuit interrupter for interrupting a circuit and a disconnector disconnecting the circuit. A second hermetic vessel filled with an electrically insulating gas and having accommodated therein a disconnector and a third hermetic vessel disposed in parallel to the second hermetic vessel and filled with an electrically insulating gas and having accommodated therein a disconnector for disconnecting the circuit. The switchgear also comprises shunt conductors connected in parallel to each other between the disconnector within the first hermetic vessel and the disconnectors within the first and second hermetic vessels. The shunt conductors each comprises a conductor having terminal portions extending through and penetrating into the first hermetic vessel and the second and third hermetic vessels and a main body portion connected and shunted between the terminal portions for parallel distributing an electric power from the first hermetic vessel to the second and third hermetic vessels, an insulating material covering the main body portion, and an electrically conductive coating disposed on an outer surface of the insulating material and grounded. Therefore, the gas-insulated switchgear has a simple structure with a small number of parts and is small in temperature rise within the outer shell vessel so that the current-carrying capacity can be significantly increased.

The main body portion of the conductor may be disposed outside of the hermetic vessel, so that the structure can be made simple with a small number of parts and since the generating portion is located outside of the hermetic vessel, the heat is sufficiently dissipated from the heat generating portion and the temperature rise can be suppressed.

Each of the terminal portions of the conductor may comprise a conductor for pivotally supporting a movable contact blade of the disconnector within the hermetic vessel, so that the number of the parts can be reduced, thereby to make the structure simple.

At least three of the shunt conductors may be provided, so that the linkages for operating the disconnectors can be disposed between the shunt conductors to make the structure simple and compact.

What is claimed is:

1. A gas-insulated switchgear comprising:
   a first hermetic vessel filled with an electrically insulating gas and having accommodated therein a circuit interrupter for interrupting a circuit and a disconnector for disconnecting the circuit;
   a second hermetic vessel filled with an electrically insulating gas and having accommodated therein a disconnector;
   a third hermetic vessel disposed in parallel to said second hermetic vessel, filled with an electrically insulating gas, and having accommodated therein a disconnector for disconnecting the circuit; and
   shunt conductors connected in parallel to each other between said disconnector within said first hermetic vessel and said disconnectors within said second and third hermetic vessels;
   said shunt conductors each comprising:
   a conductor having terminal portions extending through and penetrating into said first hermetic vessel and said second and third hermetic vessels and a main body portion connected and shunted between said terminal portions for parallel distributing an electric power from said first hermetic vessel to said second and third hermetic vessels;
   an insulating material covering said main body portion; and
   an electrically conductive coating disposed on an outer surface of said insulating material and grounded.

2. A gas-insulated switchgear as claimed in claim 1, wherein said main body portion of said conductor is disposed outside of said hermetic vessel.

3. A gas-insulated switchgear as claimed in claim 1, wherein each of said terminal portions of said conductor comprises a conductor for pivotally supporting a movable contact blade of said disconnector within said hermetic vessel.

4. A gas-insulated switchgear as claimed in claim 1, wherein at least three of said shunt conductors are provided.

5. A gas-insulated switchgear as claimed in claim 4, wherein a linkage for operating said disconnectors is disposed between said shunt conductors.

* * * * *